United States Patent [19]
Anchor et al.

[11] Patent Number: 5,478,883
[45] Date of Patent: Dec. 26, 1995

[54] EMULSION POLYMERIZATION PROCESS UTILIZING A SPECIFICALLY DEFINED ETHYLENICALLY UNSATURATED POLYMERIZABLE WATER-SOLUBLE NONIONIC SURFACTANT FORMED BY THE REACTION OF A DIALLYLAMINE, ETHYLENE OXIDE AND PROPYLENE OXIDE AND/OR BUTYLENE OXIDE

[75] Inventors: Michael J. Anchor, Northville; Sridhar Gopalkrishnan, Woodhaven, both of Mich.

[73] Assignee: BASF Corporation, Mount Olive, N.J.

[21] Appl. No.: 419,947

[22] Filed: Apr. 11, 1995

[51] Int. Cl.$^6$ ....................................................... C08L 39/00
[52] U.S. Cl. ............................ 524/812; 524/555; 526/312
[58] Field of Search ...................................... 524/812, 555; 526/312

[56] References Cited

U.S. PATENT DOCUMENTS

| | | | |
|---|---|---|---|
| 3,941,859 | 3/1976 | Wu | 525/211 |
| 4,049,608 | 9/1977 | Steckler et al. | 524/817 |
| 4,551,506 | 11/1985 | Gosselink | 525/417 |
| 4,946,627 | 8/1990 | Leighton et al. | 252/542 |
| 5,162,475 | 11/1992 | Tank et al. | 526/333 |
| 5,294,692 | 3/1995 | Barron et al. | 526/301 |

*Primary Examiner*—Mark Nagumo
*Attorney, Agent, or Firm*—Burns, Doane, Swecker & Mathis

[57] ABSTRACT

An improved emulsion polymerization process utilizing at least one substantially water-insoluble ethylenically unsaturated monomer is provided for forming discrete solid polymeric particles suitable for use in coating and/or adhesive applications. During at least the initial portion of the polymerization a dissolved water-soluble polymerizable surfactant (as defined) formed by the reaction of a diallylamine, ethylene oxide, and propylene oxide and/or butylene oxide additionally is provided in the reaction zone in the continuous aqueous phase. The water-soluble polymerizable surfactant undergoes copolymerization and is substantially completely consumed during the course of the emulsion polymerization. The emulsion polymerization is carried out on a stable basis, there is no need to attempt to remove a surfactant at the conclusion of the emulsion polymerization, and the resulting polymeric particles are particularly well suited for coating and/or adhesive end uses where they form stable films and exhibit improved adhesion characteristics.

22 Claims, No Drawings

5,478,883

EMULSION POLYMERIZATION PROCESS UTILIZING A SPECIFICALLY DEFINED ETHYLENICALLY UNSATURATED POLYMERIZABLE WATER-SOLUBLE NONIONIC SURFACTANT FORMED BY THE REACTION OF A DIALLYLAMINE, ETHYLENE OXIDE AND PROPYLENE OXIDE AND/OR BUTYLENE OXIDE

BACKGROUND OF THE INVENTION

The emulsion polymerization of a water-insoluble ethylenically unsaturated monomer long has been utilized to form solid polymeric particles that are intended for a variety of end uses. During the polymerization small droplets of liquid monomer are provided at an elevated temperature while suspended in a continuous aqueous phase. In the prior art it has been a common practice to include a water-soluble surface active agent within the aqueous phase that aids in the desired maintenance of the suspended monomer as small spheres wherein the polymerization commonly takes place via a free-radical mechanism. Commonly the water-soluble surface agents are anionic, nonionic, or mixtures of anionic and nonionic surfactants.

When the resulting polymeric particles are utilized in coating and/or adhesive applications, residual surface active agent remaining from the polymerization reaction can be detrimental and can interfere with the performance of the resulting latex and products derived from the final latex. For instance, if dissolved ionic compounds are encountered, this can lead to a destabilization of the suspended polymeric particles and cause an unwanted coagulation of the polymeric particles. Also, when applied to a substrate to form a coating and/or adhesive, the residual surfactant can interfere with the desired adhesion to the substrate particularly if the surfactant concentration is more than a small amount. The scrubability and water sensitivity of a resulting film can be adversely influenced. Additionally, residual surfactant can sometimes cause an undesirable "blooming" that leads to surface irregularities in a resulting polymeric film or layer once it is applied to a substrate.

Heretofore, in some instances it has been proposed to employ certain polymerizable surfactants during an emulsion polymerization process. See, for instance, U.S. Pat. Nos. 4,049,608 and 5,162,475. Additionally, an epoxy resin can be provided to react with residual surfactant as disclosed in U.S. Pat. No. 3,941,857. Polymerizable substances such as allyl alcohol have been found to lead to the formation of undesirably large concentrations of coagulum in the resulting product.

It is an object of the present invention to provide an improved emulsion polymerization process for forming discrete polymeric particles that are well suited for use in coating and/or adhesive applications.

It is an object of the present invention to provide an improved emulsion polymerization process for forming discrete polymeric particles wherein the surfactant utilized during the polymerization does not interfere with the quality of a layer of a coating and/or adhesive formed by the resulting polymer.

It is an object of the present invention to provide an improved emulsion polymerization process wherein the resulting suspension of dispersed polymeric particles is not rendered unstable by the presence of dissolved ionic compounds.

It is an object of the present invention to provide an improved emulsion polymerization process wherein the resulting suspension of dispersed polymeric particles exhibits an enhanced mechanical stability and the ability to withstand freezing and thawing while retaining good particle dispersion.

It is an object of the present invention to provide an improved emulsion polymerization process wherein the resulting polymeric particles exhibit improved adhesion to a substrate when applied as a coating and/or an adhesive.

It is another object of the present invention to provide an improved emulsion polymerization process wherein coatings formed from the resulting product tend to remain uniform and stable upon the passage of time even when exposed to water at an elevated temperature.

It is a further object of the present invention to provide discrete solid polymeric particles that are well suited for use in coating and/or adhesive applications.

These and other objects and advantages, as well as the scope, nature, and utilization of the claimed invention will be apparent to those skilled in the art from the following detailed description and appended claims.

SUMMARY OF THE INVENTION

It has been found that in an emulsion polymerization process for forming discrete solid polymeric particles suitable for use in coating and/or adhesive applications wherein at least one substantially water-insoluble ethylenically unsaturated monomer present in a reaction zone undergoes free radical polymerization at an elevated temperature while suspended in a continuous aqueous phase, improved results are achieved by providing in the reaction zone in the continuous aqueous phase during at least an initial portion of the polymerization a dissolved water-soluble polymerizable ethylenically unsaturated surfactant formed by the reaction of a diallylamine with approximately 50 to 90 (e.g., approximately 60 to 80) weight percent of ethylene oxide and approximately 10 to 50 (e.g., approximately 20 to 40) weight percent of propylene oxide and/or butylene oxide, wherein the water-soluble polymerizable surfactant has a number average molecular weight of approximately 1,000 to 15,000 (e.g., approximately 2,000 to 9,000) and is provided in a concentration of approximately 1 to 10 (e.g., approximately 2 to 4) percent by weight based upon the total weight of ethylenically unsaturated monomer present in the reaction zone and the water-soluble polymerizable ethylenically unsaturated surfactant undergoes copolymerization with other ethylenically unsaturated monomer present in said reaction zone and is substantially completely consumed during the course of the emulsion polymerization.

Discrete solid polymeric particles formed in accordance with the improved process of the present invention also are provided that are particularly well suited for use in coating and/or adhesive applications.

DESCRIPTION OF PREFERRED EMBODIMENTS

In accordance with the improved emulsion polymerization process of the present invention at least one substantially water-insoluble ethylenically unsaturated monomer is provided with stirring as the dispersed phase at an elevated temperature where it is capable of undergoing free-radical polymerization while suspended in a continuous aqueous phase. Any substantially water-insoluble ethylenically unsaturated monomer that is capable of undergoing free-radical emulsion polymerization may be utilized. Also, one or more water-soluble ethylenically unsaturated monomer may also be included provided such monomer is capable of entering into the free-radical polymerization to form solid polymeric particles during the emulsion polymerization.

The ethylenically unsaturated monomer or monomers which may be polymerized or copolymerized in accordance with the improved emulsion polymerization process of the present invention are well known in the art and are exemplified hereafter in a representative manner. For instance, suitable ethylenically unsaturated monomers are represented by, but not restricted to, mono- and polyunsaturated hydrocarbon monomers, vinyl esters (e.g., vinyl esters of $C_1$ to $C_6$ saturated monocarboxylic acids), vinyl ethers, monoethylenically unsaturated mono- and polycarboxylic acids and their alkyl esters (e.g., acrylic acid esters and methacrylic acid esters, particularly their $C_1$ to $C_{12}$ alkyl, and more particularly their $C_1$ to $C_4$ alkyl esters), the nitriles, vinyl and vinylidene halides, amides of unsaturated carboxylic acids, and amino monomers.

Representative examples of hydrocarbon monomers include compounds such as the styrene compounds (e.g., styrene, carboxylated styrene, and alpha-methyl styrene), and conjugated dienes (e.g., butadiene, isoprene and copolymers of butadiene and isoprene). Representative examples of vinyl and vinylidene halides include vinyl chloride, vinylidene chloride, vinyl fluoride and vinylidene fluoride.

Acrylic ester and methacrylic ester examples include $C_1$ to $C_{12}$ (e.g., $C_1$ to $C_4$) alkyl acrylates and methacrylates. Typical acrylic esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, hexyl acrylate, 2-ethylhexyl acrylate, 2-ethylhexyl methacrylate, t-butyl acrylate, t-butyl methacrylate, 3,3-dimethylbutyl acrylate, 3,3-dimethyl butyl methacrylate, and lauryl acrylate.

Suitable vinyl esters include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as allyl acetate, allyl propionate and allyl lactate.

Typical vinyl ethers include methylvinyl ether, ethylvinyl ether and n-butylvinyl ether. Typical vinyl ketones include methylvinyl ketone, ethylvinyl ketone and isobutylvinyl ketone. Suitable dialkyl esters of monoethylenically unsaturated dicarboxylic acids include dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate, and dioctyl itaconate.

Suitable monoethylenically unsaturated monocarboxylic acids include acrylic acid, methacrylic acid, ethacrylic acid, and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives (e.g., alphachloroacrylic acid), and the anhydrides of these acids (e.g., maleic anhydride and citraconic anhydride) are suitable for use as monomers. Acrylic acid and methacrylic acid are examples of water-soluble ethylenically unsaturated monomers that can be included.

Acrylonitrile, alpha-chloroacrylonitrile and methacrylonitrile are among the corresponding nitriles of such acids which can be used as monomers. Suitable amides of such acids include unsubstituted amides such as acrylamide, methacrylamide and other alpha-substituted acrylamides and N-substituted amides obtained by conventional reaction of the amides of the aforementioned mono- and polycarboxylic acids with an aldehyde, such as formaldehyde. Typical N-substituted amides include N-methylolacrylamide, N-methylolmethacrylamide, alkylated N-methylolacrylamides and N-methylolmethacrylamides, such as N-methoxymethylacrylamide and N-methoxymethylmethacrylamide.

Typical amino monomers include substituted and unsubstituted aminoalkyl acrylates, hydrochloride salts of amino monomers and methacrylates, such as beta-aminoethylacrylate, beta-amino-ethylmethacrylate, dimethylaminomethylacrylate, beta-methylaminoethylacrylate, and dimethylaminomethylmethacrylate.

Hydroxy-containing monomers include beta-hydroxyethylacrylate, beta-hydroxypropylacrylate, gamma-hydroxypropylacrylate and beta-hydroxyethylmethacrylate.

The aforesaid monomers, particularly the acrylic esters and methacrylic esters, may be homopolymerized or copolymerized with other of the described monomers, i.e., one or more different monomers capable of addition type polymerization via a free-radical polymerization. Typical ethylenically unsaturated monomers for use in the improved emulsion polymerization process of the present invention include a combination of styrene and acrylic monomers, non-aromatic vinyl monomers, a combination of vinyl acetate and acrylic monomers, and solely acrylic monomers.

During the improved emulsion polymerization process of the present invention a minor concentration of a specifically defined water-soluble polymerizable surfactant formed by the reaction of a diallylamine with ethylene oxide and propylene oxide and/or butylene oxide is provided in the reaction zone in the continuous aqueous phase. Such polymerizable surfactant possesses ethylenic unsaturation at two locations and is capable of readily undergoing free-radical addition polymerization with the monomer that is provided in the reaction zone in a major concentration. In a preferred embodiment diallyamine that is lacking substitution of one or more of the hydrogen atoms present on a carbon atom is utilized. However, if desired, one or more of such hydrogen atoms can be substituted with a lower alkyl group of 1 to 4 carbon atoms or halogen (e.g., Cl, Br, or I). In the polymerizable surfactant the hydrogen atom located on the nitrogen atom of a diallylamine has served as the reaction site for the addition of approximately 50 to 90 weight percent of ethylene oxide and approximately 10 to 50 weight percent of propylene oxide and/or butylene oxide in the presence of a catalyst to produce a water-soluble polymerizable surfactant having a number average molecular weight of approximately 1,000 to 15,000. In the resulting polymerizable surfactant the recurring units derived from ethylene oxide are hydrophilic in nature and the recurring units derived from propylene oxide and/or butylene oxide are hydrophobic in nature. Such recurring units derived from ethylene oxide and propylene oxide and/or butylene oxide can be present as one or more substantially uniform blocks or present as randomly occurring moieties. When a block arrangement is utilized, there commonly is a single block derived from ethylene oxide and a single block derived from propylene oxide and/or butylene oxide. However, if desired, a plurality of smaller blocks may be utilized so long as the specified molecular weight is satisfied. The order in which the respective blocks are disposed within the water-soluble polymerizable surfactant is not critical.

The polymerizable water-soluble surfactant utilized in the improved emulsion polymerization process of the present invention preferably exhibits an HLB (Hydrophilic-Lipophilic-Balance) of approximately 16 to 24. Such HLB determination can be made by measuring the surface tension of a 0.1 weight percent aqueous solution of the water-soluble polymerizable surfactant at 25° C. by use of a Du Nouy tensiometer.

In a preferred embodiment, during the formation of the specifically defined water-soluble polymerizable surfactant, approximately 60 to 80 weight percent of ethylene oxide and approximately 20 to 40 weight percent of propylene oxide and/or butylene oxide are reacted with a diallylamine in the presence of a catalyst to yield a reactive monomer possessing ethylenic unsaturation at two locations having a molecular weight of approximately 2,000 to 9,000.

During at least an initial portion of the improved emulsion polymerization process of the present invention, the water-soluble polymerizable surfactant is introduced into the continuous aqueous phase of the reaction zone in an effective concentration of approximately 1 to 10 percent by weight based upon the total weight of ethylenically unsaturated monomer introduced into the reaction zone. In a particularly preferred embodiment such concentration is approximately 2 to 4 percent by weight based upon the total weight of ethylenically unsaturated monomer introduced into the reaction zone. Good initial dispersion of the major monomer present in the reaction zone is facilitated by the presence of the specifically defined polymerizable surfactant. As the emulsion polymerization reaction proceeds, the water-soluble polymerizable surfactant enters into the growing polymeric chains in a substantially random manner via a free-radical addition polymerization reaction and is substantially completely consumed during the course of the emulsion polymerization.

A sufficient quantity of a polymerization initiator (such as a conventional free-radical initiator) is introduced into the reaction zone to cause the polymerization to proceed at a satisfactory rate at the particular elevated temperature that is utilized. Initiators used in emulsion polymerization processes are of the type which produce free radicals and conveniently are peroxygen compounds. For example, these include, inorganic peroxides, such as hydrogen peroxide and inorganic persulfate compounds, such as ammonium persulfate, sodium persulfate and potassium persulfate; organic hydroperoxides, such as cumene hydroperoxide and tertiary butyl hydroperoxide; organic peroxides, such as benzoyl peroxide, acetyl peroxide, lauroyl peroxide, peroxydicarbonate esters, such as diisopropyl peroxydicarbonate, peracetic acid and perbenzoic acid that are sometimes activated by water-soluble reducing agents such as ferrous compounds, sodium bisulfite or hydroxylamine hydrochloride and other free-radical-producing materials, such as 2,2'-azobisisobutyronitrile.

A minor concentration of a conventional non-polymerizable surfactant can additionally be provided in the reaction zone during the course of the polymerization. If such supplemental surfactant is utilized, it preferably is anionic, nonionic, or a mixture of anionic and nonionic types, and is provided in a low concentration of approximately 0.1 to 1.5 percent by weight of the total contents of the reaction zone. Such additional non-polymerizable surfactant serves the role of adjusting the particle size of the resulting polymeric particles. In a particularly preferred embodiment such additional non-polymerizable surfactant is not utilized and the reaction zone for the desired emulsion polymerization is substantially free of a surfactant other than the water-soluble polymerizable surfactant.

The emulsion polymerization process of the present invention commonly is carried out at an elevated temperature of approximately 50° to 95° C., and most preferably at an elevated temperature of approximately 60° to 75° C., with such temperature commonly being influenced by the reactivity of the initiator that is utilized and its concentration as will be apparent to those skilled in emulsion polymerization of ethylenically unsaturated monomers.

The following Examples are presented as specific illustrations of the present invention. It should be understood, however, that the invention is not limited to the specific details set forth in the Examples.

In the Examples that follow emulsion polymerization runs were carried out and the resulting polymeric products were evaluated in accordance with the procedures described hereafter.

The amount of agglomerated solid polymeric particles, commonly known as "coagulum", present in the resulting latices at the conclusion of the polymerization was determined by collecting such agglomerated particles on a filter having openings sufficiently large to allow the discrete unagglomerated polymeric particles to pass, rinsing the collected agglomerated solid particles with water, and weighing the remaining agglomerated particles. The percent coagulum was calculated by dividing the weight of the coagulum by the theoretical weight of the solids based upon the weight of monomers utilized during the polymerization.

The viscosity of the resulting latices following polymerization was determined by the use of RV Brookfield viscometer equipped with a No. 1 spindle. During such determinations 300 ml. of each latex were placed in a 400 mi. beaker and the viscometer was operated at 100 revolutions per minute.

The mechanical stability of the resulting latices following exposure to mechanical stress was evaluated to determine the extent to which there has been a change in the viscosity and/or the visual presence of coagulum. More specifically, two cups of each latex were placed in a five-cup glass blender, and the blender was operated for five minutes or until the latex totally coagulates. If total coagulation is absent, the viscosity of the latex next was evaluated following standing for one day.

The freeze/thaw stability was determined by freezing and thawing each latex sample, and subsequently inspecting the same for the presence of coagulation or an increase in viscosity. More specifically, 70 grams of each latex were placed in a wide-mouth 4-oz. polyethylene bottle, were placed in a freezer for 16 hours, and were allowed to thaw at room temperature for 8 hours. After such thawing the latex was examined visually for coagulum and the viscosity was determined. The number of the freeze/thaw cycle wherein the presence of coagulum or an increase in viscosity occurred was recorded.

The electrolyte stability of the resulting latices was determined by mixing a drop of the latex into solutions containing varying concentrations of calcium chloride, and visually examining each solution for the presence of coagulum. More specifically, solutions of calcium chloride were provided using deionized water in weight concentrations of 0.001 percent, 0.01 percent, 0.1 percent, 1.0 percent, 3.0 percent, 5.0 percent, and 10.0 percent. 10 ml. of each calcium chloride solution was provided in a test tube, one drop of the latex was added, a stopper was applied to the test tube, mixing was carried out, and the contents of the test tube were visually observed. When coagulum is readily apparent the solution is considered to contain "definite coagulum" as indicated by "DC" in the tables that follow. When only a small quantity of coagulum is visible when viewed under a magnifying lamp, the solution is considered to contain "very slight coagulum" as indicated by "VSC" in the tables that follow. When no coagulum is visible when viewed under a magnifying lamp, the solution is considered to be "stable" as indicated by "S" in the tables that follow.

The particle size of the resulting latices was determined by the use of a NICOMP particle size analyzer in accordance with the standard procedure for operating such equipment.

The water sensitivity of the resulting latices was determined by initially placing 4 grams of the latex at the conclusion of the polymerization on a dish of known weight, and placing the dish containing the latex in a vented oven maintained at 60° C. for 4 hours to accomplish drying and the formation of a thin film on each dish. The dishes containing the dried latices next were removed from the oven and were allowed to cool overnight. The amount of dried latex present was determined in each instance by weighing. Deionized water was next added to each dish and was in contact with each dried latex for 4 hours. The amount of absorbed water next was determined by weighing and was calculated as a percentage of the weight of the dried latex. The greater the quantity of absorbed water, the lesser the water sensitivity of the film formed by the latex.

The foam height of each latex was determined by rotating a dilute latex solution in a cylinder and measuring the amount of foam that was generated. More specifically, a fixed quantity of latex containing 5 percent solids was placed in a cylinder, the height of the latex was measured, the cylinder was closed and the cylinder was mechanically rotated for 31 revolutions over a period of 60 seconds. At the conclusion of such mixing the foam height was measured by determining the distance between the top of the foam and the original height of the solution.

EXAMPLE I

A water-soluble polymerizable surfactant suitable for use in the improved emulsion polymerization process of the present invention was formed by initially reacting diallylamine with propylene oxide and subsequently with ethylene oxide.

More specifically, to a 1-gallon stainless steel autoclave, 500 grams of diallylamine were charged, and the autoclave was sealed and was pressurized to 35 psig with nitrogen. The autoclave was vented to approximately 0 to 2 psig, and while sealed was heated to 93° C. Over an 8 hour period, 269 grams of propylene oxide were added, the temperature was allowed to rise to 125° C. during the first 40 minutes of addition and was maintained at this temperature while the addition continued. The propylene oxide was allowed to react with diallylamine over an additional period of one hour while maintained at 125° C. During the course of this reaction the hydrogen atom located on the nitrogen atom of the diallylamine served as the reaction site for the addition of a unit derived from propylene oxide. The reaction mixture was cooled to 102° C., the autoclave was vented to 0 psig, and the autoclave was resealed. Another 32 grams of propylene oxide were added over a 3 hour period at 102° C. and were allowed to react for another hour at 102° C. The resulting intermediate product of diallyl-2-hydroxylpropylamine was recovered following the cooling of the contents of the autoclave to room temperature.

This diallyl-2-hydroxypropyleneamine intermediate product in the quantity of 342 grams was next charged to a 1-gallon stainless steel autoclave together with 14.2 grams of potassium tertbutoxide initiator, the autoclave was sealed, the autoclave was purged twice with nitrogen at 50 psig, the autoclave was vented to approximately 0 to 2 psig, the temperature of the autoclave was raised to approximately 115° C., and the pressure was readjusted to approximately 0 to 2 psig. Over an 8 hour period another 1357.7 grams of propylene oxide were added, the temperature of the autoclave was maintained at 115° C., and the pressure within the autoclave was maintained at <90 psig. Once all of this charge of propylene oxide was added, the contents of the autoclave were maintained at 115° C. for another 2 hours and the autoclave was vented to 0 psig. The reaction mixture while at 115° C. was stripped at <10 mm. Hg for 1 hour, was cooled to 40° C., and was discharged into an intermediate holding tank. This intermediate product formed by the addition of additional propylene oxide was found to possess a number average molecular weight of 626.6 by esterification with phthalic anhydride in anhydrous pyridine.

The resulting intermediate product of diallylamine and propylene oxide in a quantity of 353.3 grams that contained additional units derived from propylene oxide was next charged to a 1-gallon stainless steel autoclave, the autoclave was sealed, and was pressurized to 50 psig with nitrogen and was vented to approximately 0 to 2 psig with the pressurization and venting being conducted three times in succession. To the autoclave next were added another 456.5 grams of propylene oxide over a 2 hour period at 115° C. and <90 psig pressure. After all of the propylene oxide was charged, the contents of the reactor were allowed to further react at 115° C. for 2 hours during which time additional units of propylene oxide were chemically bound to extend the blocks derived from propylene oxide that were present on the molecules of diallylamine.

The autoclave next was heated to 145° C. and the pressure was adjusted to 34 psig. To the autoclave next were added 1890 grams of ethylene oxide over a 4.5 hour period at 145° C. and <90 psig. Whenever the pressure rose above 85 psig the addition of the ethylene oxide was slowed. The ethylene oxide reacted at the terminal ends of the previously formed blocks of recurring units derived from propylene oxide, the contents of the autoclave were cooled to 95° C. and 3.1 grams of phosphoric acid were added in order to accomplish neutralization. Following mixing for 30 minutes, the contents of the reactor were vacuum stripped at 95° C. for 1 hour, were cooled at 65° C., and were discharged into a holding tank. The resulting water-soluble polymerizable surfactant for use in the improved polymerization process of the present invention possessed a number average molecular weight of 3,610 by use of phthalic anhydride esterification in pyridine, and included approximately 21 weight percent of units derived from ethylene oxide and approximately 79 weight percent of units derived from propylene oxide based upon the total weight of such units.

The emulsion polymerization of 3 parts by weight of the resulting water-soluble polymerizable surfactant, 49 parts by weight of styrene, 49 parts by weight butyl acrylate, and 2 parts by weight of methacrylic acid next was carried out in a stirred reactor over a period of 4 hours while provided at 65° C. and atmospheric pressure. The reactor included 93.05 parts by weight of water and an initiator that consisted of 0.4 part by weight of sodium persulfate and 0.55 part by weight of sodium meta-bisulfite. No additional surfactant was provided. During the course of the polymerization the styrene, butyl acrylate, and methacrylic acid monomers were suspended as tiny droplets within the continuous aqueous phase. The water-soluble polymerizable surfactant entered into free-radical polymerization with the other ethylenically unsaturated monomers and was substantially completely consumed during the course of the emulsion polymerization. The pH at the conclusion of the polymerization was 2.5 and the latex contained approximately 50 percent solids by weight that were present as discrete solid polymeric particles.

Table 1 presents the results of an evaluation of the product of Example I in accordance with the previously described procedures. For comparative purposes data also is provided for two additional latices not in accordance with the present invention. More specifically, such additional latices lacked the water-soluble polymerizable surfactant of Example I during their formation and substituted a like quantity of a non-polymerizable surfactant.

Comparative Latex A utilized during its formation a water-soluble tri-block nonionic surfactant having a number average molecular weight of approximately 4,700 consisting of two blocks of units derived from ethylene oxide with an intermediate block of units derived from propylene oxide. In such tri-block nonionic surfactant used in the formation of Comparative Latex A the units derived from ethylene oxide were present in a concentration of approximately 80 percent by weight and the units derived from propylene oxide were present in a concentration of approximately 20 percent by weight.

Comparative Latex B utilized during its formation a water-soluble nonionic surfactant having a number average molecular weight of approximately 2,500 formed by the reaction of octylphenyl with 40 moles of ethylene oxide. Such surfactant commonly is utilized on a commercial basis during the emulsion polymerization of ethylenically unsaturated monomers.

EXAMPLE II

Example I was repeated with the exceptions indicated to form a vinyl/acrylic latex.

The emulsion polymerization of 3 parts by weight of the resulting water-soluble polymerizable surfactant, 90 parts by weight of vinyl acetate, and 10 parts by weight butyl acrylate was carried out in a stirred reactor over a period of 3¼ hours at 60° C. and atmospheric pressure. The polymerizable surfactant initially was dissolved into the vinyl acetate and butyl acrylate monomers. The reactor included 0.4 part by weight of sodium acetate that served as a pH buffer, 0.61 part by weight of t-butylhydroperoxide that served as an initiator, 0.24 part by weight of sodium lauryl sulfate that served as an anionic supplemental surfactant, 0.51 part by weight of sodium hydroxymethanesulfinate that served as reducing agent, and 100 parts by weight of water. The pH at the conclusion of the polymerization was raised to approximately 6 by the addition of ammonium hydroxide, and the latex contained approximately 51 percent solids by weight.

Table 2 presents the results of an evaluation of the product of Example II in accordance with the procedures that were previously described. For comparative purposes data also is provided for two additional latices not in accordance with the present invention that were formed through the substitution of the same non-polymerizable surfactants discussed in connection with Example I. The corresponding vinyl acetate/acrylic latices are identified as was done in connection with Example I on the basis of the non-polymerizable surfactant that was utilized.

TABLE 1

| | Latex of Styrene/Acrylic Polymer | | | | | | | | | | | |
|---|---|---|---|---|---|---|---|---|---|---|---|---|
| | | | Mechanical | Freeze/ | Electrolyte Stability Percent CaCl$_2$ | | | | | Particle Size | Water Sensitivity | Foam Height |
| | Coagulum | Viscosity | Stability | Thaw | | | | | | | | |
| Surfactant | (Percent) | (CPS.) | (CPS.) | Cycles | 0.1 | 1 | 3 | 5 | 10 | (μm.) | (Percent) | (mm.) |
| Polymerizable Surfactant of Example I | 1.0 | 50 | 58 | 2 | S | S | S | S | S to VSC | 0.395 | 2.2* | 100 |
| Non-Polymerizable Nonionic Surfactant of Comparative Latex A | <0.1 | 63 | 52 | 1 | VSC | DC | DC | DC | DC | 0.27 | 0.44 | 110 |
| Non-Polymerizable Nonionic Surfactant of Comparative Latex B | 0.1 | 79 | 95 | 1 | S | S | S | S | S | 0.27 | 1.4 | 105 |

*Additional water was absorbed due to some cracking in the test surface.

It will be noted from the data presented in Table 1 that the styrene/acrylic latex formed in accordance with the present invention utilizing the specifically defined polymerizable surfactant derived from diallylamine, ethylene oxide, and propylene oxide exhibited improved stability when subjected to freeze/thaw testing in combination with good electrolytic stability in the presence of calcium chloride. Also, generally satisfactory values were reported in other areas.

TABLE 2

| | Latex of Vinyl/Acrylic Polymer | | | | | | | | | | | |
|---|---|---|---|---|---|---|---|---|---|---|---|---|
| | Coagulum | Viscosity | Mechanical Stability | Freeze/ Thaw | Electrolyte Stability Percent CaCl$_2$ | | | | | Particle Size | Water Sensitivity | Foam Height |
| Surfactant | (Percent) | (CPS.) | (CPS.) | Cycles | 0.1 | 1 | 3 | 5 | 10 | (μm.) | (Percent) | (mm.) |
| Polymerizable Surfactant of Example I | 0.9 | 38 | 42 | 1 | S | S | S | S | S to VSC | 0.2 and 0.6 | 1.0 | 80 |
| Non-Polymerizable Nonionic Surfactant of Comparative Latex A | 0.3 | 43 | 69 | 1 | VSC | VSC | VSC | VSC | VSC | 0.35 | 2.0 | 75 |
| Non-Polymerizable Nonionic Surfactant of Comparative Latex B | 0.29 | 60 | Coagulated | 1 | S | S | S | S | S | 0.25 | 4.7 | 135 |

It will be noted from the data presented in Table 2 that the vinyl/acrylic latex formed in accordance with the present invention utilizing the specifically defined polymerizable surfactant derived from diallylamine, ethylene oxide, and propylene oxide exhibited improved stability when subjected to the mechanical stability test. The electrolyte stability of such latex also was very good, and the water sensitivity value was superior.

Table 3 presents the results of an evaluation of the product of Example III in accordance with the procedures that were previously discussed. For comparative purposes data also is provided for two additional latices not in accordance with the present invention that were formed through the substitution of the same non-polymerizable surfactants discussed in connection with Example I. The corresponding acrylic latices are identified as was done in connection with Example I on the basis of the non-polymerizable surfactant that was utilized during their formation.

TABLE 3

| | Latex of Acrylic Polymer | | | | | | | | | | | |
|---|---|---|---|---|---|---|---|---|---|---|---|---|
| | Coagulum | Viscosity | Mechanical Stability | Freeze/ Thaw | Electrolyte Stability Percent CaCl$_2$ | | | | | Particle Size | Water Sensitivity | Foam Height |
| Surfactant | (Percent) | (CPS.) | (CPS.) | Cycles | 0.1 | 1 | 3 | 5 | 10 | (μm.) | (Percent) | (mm.) |
| Polymerizable Surfactant of Example I | 0.25 | 54 | 58 | 1 | S | S | S | S | S to VSC | 0.30 | 1.16 | 90 |
| Non-polymerizable Nonionic Surfactant of Comparative Latex A | 0.80 | 49 | 49 | 1 | DC | DC | DC | DC | DS | 0.44 | 1.5 | 110 |
| Non-Polymerizable Nonionic Surfactant of Comparative Latex B | Trace | 71 | High and off the scale | 1 | S | S | VSC | VSC | DC | 0.28 | 0.4 | 125 |

EXAMPLE III

Example I was repeated with the exceptions indicated to form an acrylic latex.

The emulsion polymerization of 3 parts by weight of the resulting polymerizable surfactant, 45 parts by weight of methyl methacrylate, and 54.5 parts by weight of butyl acrylate was carried out in a stirred reactor over a period of 3.25 hours at 60° C. and atmospheric pressure. The reactor included 0.37 part by weight of sodium meta-bisulfite, 0.27 part by weight of sodium persulfate, and 93 parts by weight of water. No additional surfactant was provided. The pH at the conclusion of the polymerization was raised to approximately 8.5 by the addition of ammonium hydroxide, and the latex contained approximately 50 percent solids by weight.

It will be noted from the data presented in Table 3 that the acrylic latex formed in accordance with the present invention utilizing the specifically defined polymerizable surfactant derived from diallylamine, ethylene oxide, and propylene oxide exhibits superior electrolytic stability, coagulum, and water sensitivity values.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. In an emulsion polymerization process for forming discrete solid polymeric particles suitable for use in coating and/or adhesive applications wherein at least one substantially water-insoluble ethylenically unsaturated monomer present in a reaction zone undergoes free-radical polymerization at an elevated temperature while suspended in a continuous aqueous phase, the improvement of providing in said reaction zone in said continuous aqueous phase during at least an initial portion of the polymerization a dissolved water-soluble polymerizable ethylenically unsaturated surfactant formed by the reaction of a diallylamine with approximately 50 to 90 weight percent of ethylene oxide and approximately 10 to 50 weight percent of propylene oxide and/or butylene oxide, wherein said water-soluble polymerizable surfactant has a number average molecular weight of approximately 1,000 to 15,000 and is provided in a concentration of approximately 1 to 10 percent by weight based upon the total weight of ethylenically unsaturated monomer present in said reaction zone, and said water-soluble polymerizable ethylenically unsaturated surfactant undergoes copolymerization with other ethylenically unsaturated monomer present in said reaction zone and is substantially completely consumed during the course of said emulsion polymerization.

2. An improved emulsion polymerization process according to claim 1 wherein said at least one substantially water-insoluble ethylenically unsaturated monomer is styrene and is reacted with at least one acrylic monomer.

3. An improved emulsion polymerization process according to claim 1 wherein said at least one substantially water-insoluble ethylenically unsaturated monomer is at least one non-aromatic vinyl compound.

4. An improved emulsion polymerization process according to claim 1 wherein said at least one substantially water-insoluble ethylenically unsaturated monomer is vinyl acetate and is reacted with at least one acrylic monomer.

5. An improved emulsion polymerization process according to claim 1 wherein said at least one substantially water-insoluble ethylenically unsaturated monomer is at least one acrylic monomer.

6. An improved emulsion polymerization process according to claim 1 wherein said water-soluble polymerizable surfactant has a number average molecular weight of approximately 2,000 to 9,000.

7. An improved emulsion polymerization process according to claim 1 wherein said water-soluble polymerizable surfactant is formed by the reaction of a diallylamine with approximately 60 to 80 weight percent of ethylene oxide and approximately 20 to 40 weight percent of propylene oxide and/or butylene oxide.

8. An improved emulsion polymerization process according to claim 1 wherein said water-soluble polymerizable surfactant is formed by the reaction of a diallylamine with approximately 70 weight percent of ethylene oxide and approximately 30 weight percent of propylene oxide and/or butylene oxide.

9. An improved emulsion polymerization process according to claim 1 wherein said water-soluble polymerizable surfactant is provided in a concentration of approximately 2 to 4 percent by weight based upon the total weight of ethylenically unsaturated monomer present in said reaction zone.

10. An improved emulsion polymerization process according to claim 1 wherein said water-soluble polymerizable surfactant is provided in a concentration of approximately 3 to 4 percent by weight based upon the total weight of ethylenically unsaturated monomer present in said reaction zone.

11. An improved emulsion polymerization process according to claim 1 wherein said reaction zone is substantially free of a surfactant other than said water-soluble polymerizable surfactant.

12. Discrete solid polymeric particles suitable for use in coating and/or adhesive applications formed in accordance with the process of claim 1.

13. In an emulsion polymerization process for forming discrete solid polymeric particles suitable for use in coating and/or adhesive applications wherein at least one substantially water-insoluble ethylenically unsaturated monomer present in a reaction zone undergoes free-radical polymerization at an elevated temperature while suspended in a continuous aqueous phase, the improvement of providing in said reaction zone in said continuous aqueous phase during at least an initial portion of the polymerization a dissolved water-soluble polymerizable ethylenically unsaturated surfactant formed by the reaction of a diallylamine with approximately 60 to 80 weight percent of ethylene oxide and approximately 20 to 40 weight percent of propylene oxide and/or butylene oxide, wherein said water-soluble polymerizable surfactant has a number average molecular weight of approximately 2,000 to 9,000 and is provided in a concentration of approximately 2 to 4 percent by weight based upon the total weight of ethylenically unsaturated monomer present in said reaction zone, and said water-soluble polymerizable surfactant undergoes copolymerization with other ethylenically unsaturated monomer present in said reaction zone and is substantially completely consumed during the course of said emulsion polymerization.

14. An improved emulsion polymerization process according to claim 13 wherein said at least one substantially water-insoluble ethylenically unsaturated monomer is styrene and is reacted with at least one acrylic monomer.

15. An improved emulsion polymerization process according to claim 13 wherein said at least one substantially water-insoluble ethylenically unsaturated monomer is at least one non-aromatic vinyl compound.

16. An improved emulsion polymerization process according to claim 13 wherein said at least one substantially water-insoluble ethylenically unsaturated monomer is vinyl acetate and at least one acrylic monomer.

17. An improved emulsion polymerization process according to claim 13 wherein said at least one substantially water-insoluble ethylenically unsaturated monomer is at least one acrylic monomer.

18. An improved emulsion polymerization process according to claim 13 wherein said water-soluble polymerizable surfactant is formed by the reaction of a diallylamine with approximately 70 weight percent of ethylene oxide and approximately 30 weight percent of propylene oxide and/or butylene oxide.

19. An improved emulsion polymerization process according to claim 13 wherein said water-soluble polymerizable surfactant was formed while using diallylamine in the absence of substitution and said reaction zone is substantially free of a surfactant other than said water-soluble polymerizable surfactant.

20. Discrete solid polymeric particles suitable for use in coating and/or adhesive applications formed in accordance with the process of claim 19.

21. An improved aqueous suspension of discrete solid polymeric particles suitable for use in coating and/or adhesive applications formed in accordance with the process of claim 13.

22. Discrete solid polymeric particles suitable for use in coating and/or adhesive applications formed in accordance with the process of claim 13.

* * * * *